US008091229B2

(12) United States Patent
Deak et al.

(10) Patent No.: US 8,091,229 B2
(45) Date of Patent: Jan. 10, 2012

(54) METHOD OF REPAIRING A SUBSURFACE VOID OR DAMAGE FOR A WIND TURBINE BLADE

(75) Inventors: Stephen Michael Deak, Liberty Township, OH (US); Scott Gabell Riddell, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/042,592

(22) Filed: Mar. 8, 2011

(65) Prior Publication Data
US 2011/0209347 A1 Sep. 1, 2011

(51) Int. Cl.
*F03B 3/12* (2006.01)
*B23P 6/00* (2006.01)
*B29C 73/02* (2006.01)
*B23P 6/04* (2006.01)

(52) U.S. Cl. .......... 29/889.1; 29/402.09; 29/402.18; 29/530; 29/402.11; 264/36.1

(58) Field of Classification Search ........... 29/402.04, 29/402.09, 402.18, 402.14, 530, 889.1, 889.72; 26/36.22, 273
See application file for complete search history.

(56) References Cited

U.S. PATENT DOCUMENTS

| 3,211,813 | A | * | 10/1965 | Behrendt | 264/36.22 |
|---|---|---|---|---|---|
| 3,365,097 | A | * | 1/1968 | Chase | 52/514 |
| 4,311,656 | A | * | 1/1982 | Spriggs | 264/36.2 |
| 4,334,798 | A | * | 6/1982 | Milne | 404/75 |
| 4,354,332 | A | * | 10/1982 | Lentz | 52/514 |
| 4,517,038 | A | * | 5/1985 | Miller | 156/98 |
| 4,855,182 | A | * | 8/1989 | Ondrejas et al. | 428/343 |
| 4,858,853 | A | * | 8/1989 | Westerman et al. | 244/119 |
| 4,916,880 | A | * | 4/1990 | Westerman, Jr. | 52/514 |
| 4,978,404 | A | * | 12/1990 | Westerman, Jr. | 156/98 |
| 4,993,876 | A | * | 2/1991 | Snow et al. | 405/216 |
| 5,023,987 | A | * | 6/1991 | Wuepper et al. | 29/402.11 |
| 5,129,135 | A | * | 7/1992 | Yoshino | 29/402.14 |
| 5,245,812 | A | * | 9/1993 | Landers | 52/514 |
| 5,476,340 | A | * | 12/1995 | Contrasto | 404/75 |
| 5,543,091 | A | * | 8/1996 | Conley | 264/36.22 |
| 5,809,736 | A | * | 9/1998 | Naito et al. | 52/742.14 |
| 5,819,497 | A | * | 10/1998 | Knepper | 52/742.15 |
| 5,908,285 | A | * | 6/1999 | Graff | 416/224 |
| 6,054,673 | A | * | 4/2000 | Chen | 219/121.71 |
| 6,385,836 | B1 | * | 5/2002 | Coltrin | 29/402.18 |
| 6,656,299 | B1 | * | 12/2003 | Grosskrueger et al. | 156/98 |
| 6,770,349 | B2 | * | 8/2004 | Itoh et al. | 428/73 |
| 7,118,640 | B2 | * | 10/2006 | Westerdahl et al. | 156/94 |
| 7,252,727 | B2 | * | 8/2007 | DeTurris | 156/94 |
| 7,360,993 | B2 | * | 4/2008 | Fraenkel | 415/232 |
| 7,368,073 | B2 | * | 5/2008 | Krogager et al. | 264/36.22 |
| 7,513,024 | B2 | * | 4/2009 | Keller | 29/402.15 |
| 7,653,996 | B2 | * | 2/2010 | Jungbluth et al. | 29/889.1 |
| 7,761,989 | B2 | * | 7/2010 | Lutz et al. | 29/889.1 |
| 7,841,084 | B2 | * | 11/2010 | Meier | 29/889.2 |
| 2007/0113402 | A1 | * | 5/2007 | Lutz et al. | 29/889.1 |

* cited by examiner

*Primary Examiner* — David Bryant
*Assistant Examiner* — Jason L Vaughan
(74) *Attorney, Agent, or Firm* — Dority & Manning, P.A.

(57) ABSTRACT

A procedure for repairing subsurface defects in a shell member laminate of a wind turbine blade includes detecting the location and boundary of the subsurface defect and drilling a fill hole from an external surface of the laminate into the defect proximate to a boundary of the defect. A vent hole is drilled from the external surface of the laminate into the defect proximate to an opposite boundary from the fill hole. A flowable bonding material is injected into the fill hole until the bonding material flows from the vent hole. The repair zone is reinforced with at least one mechanical fastener defined through the laminate either within the boundary of the defect or outboard of the boundary of the defect.

10 Claims, 4 Drawing Sheets

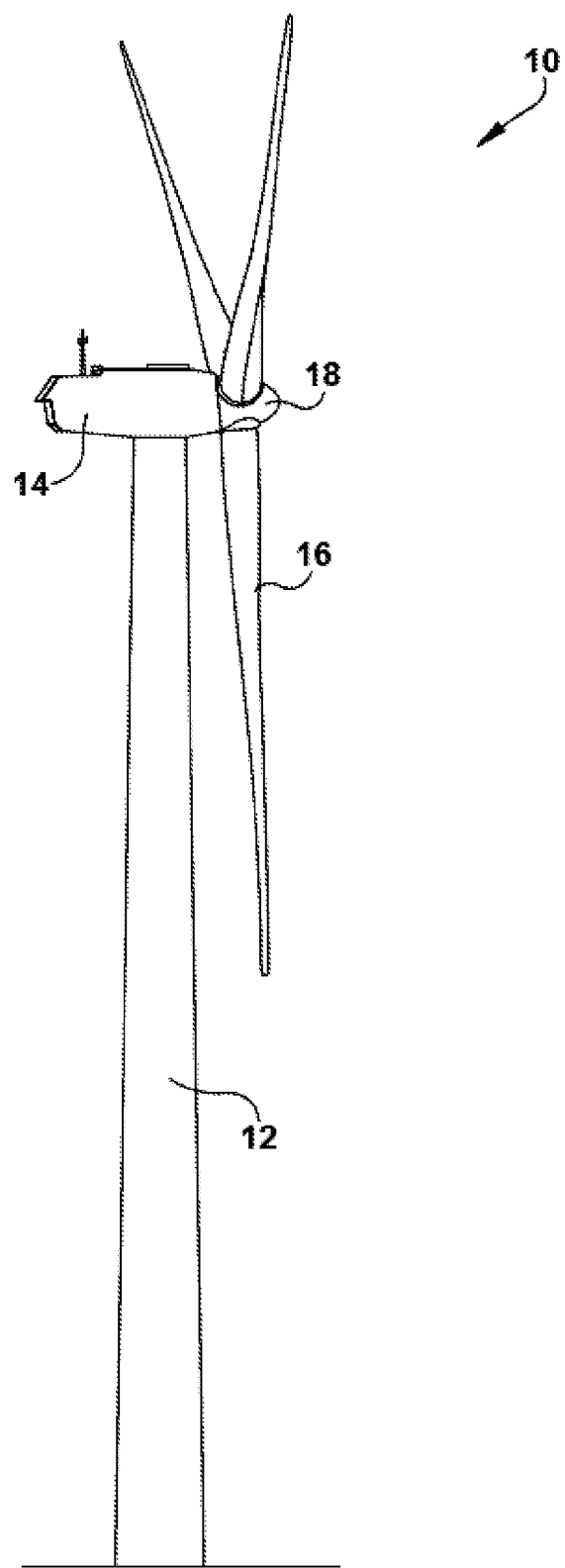
Fig. -1-

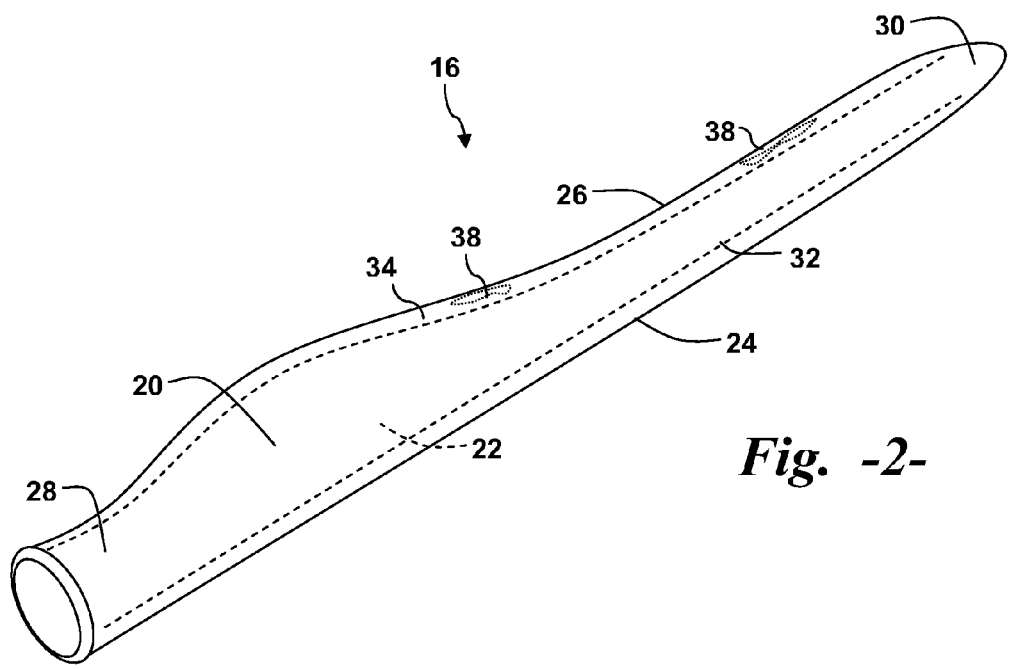
*Fig. -2-*
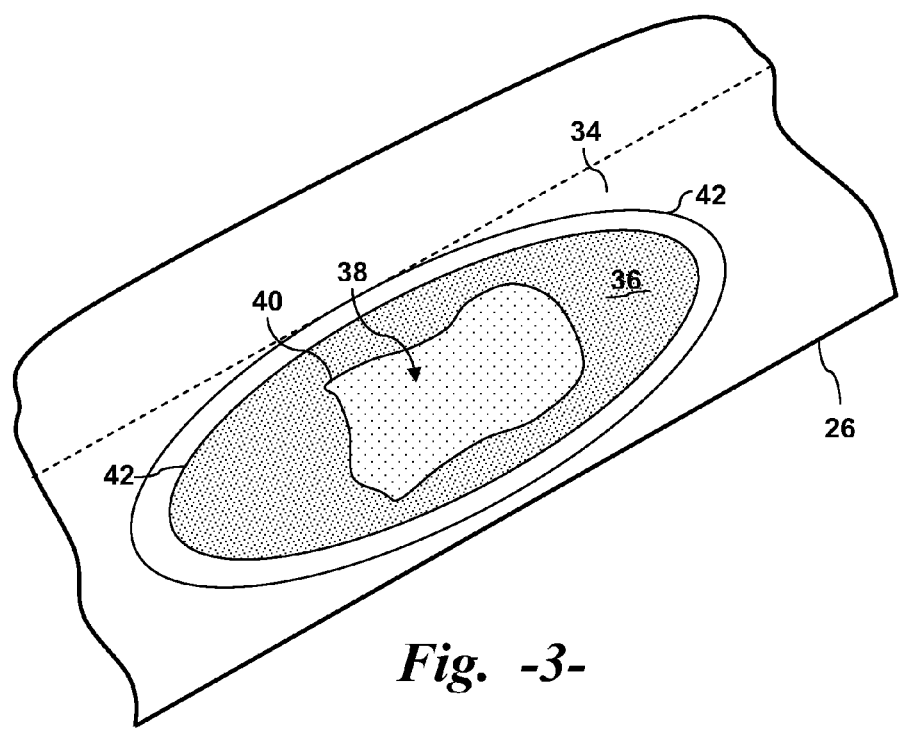
*Fig. -3-*

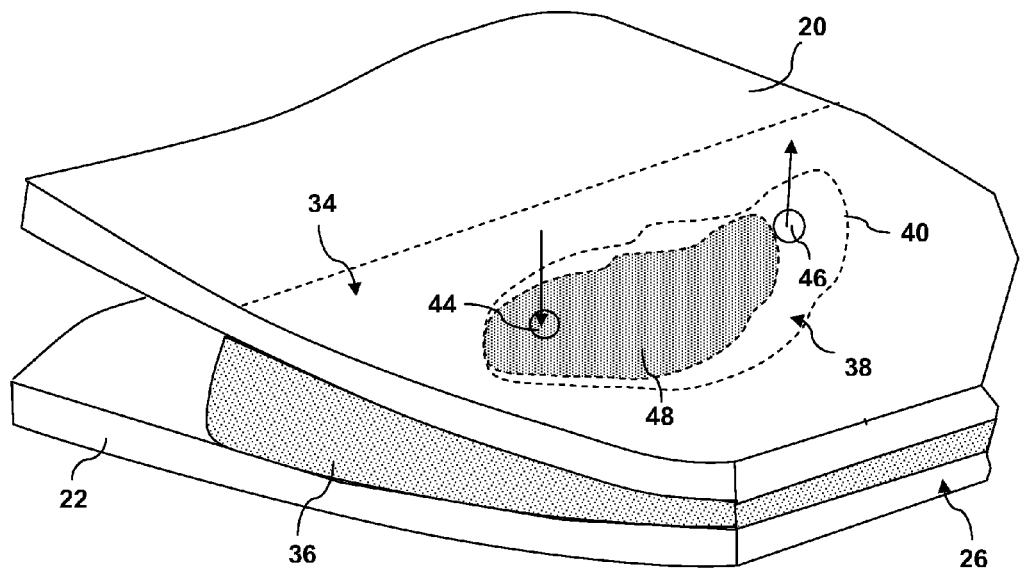
*Fig. -4-*
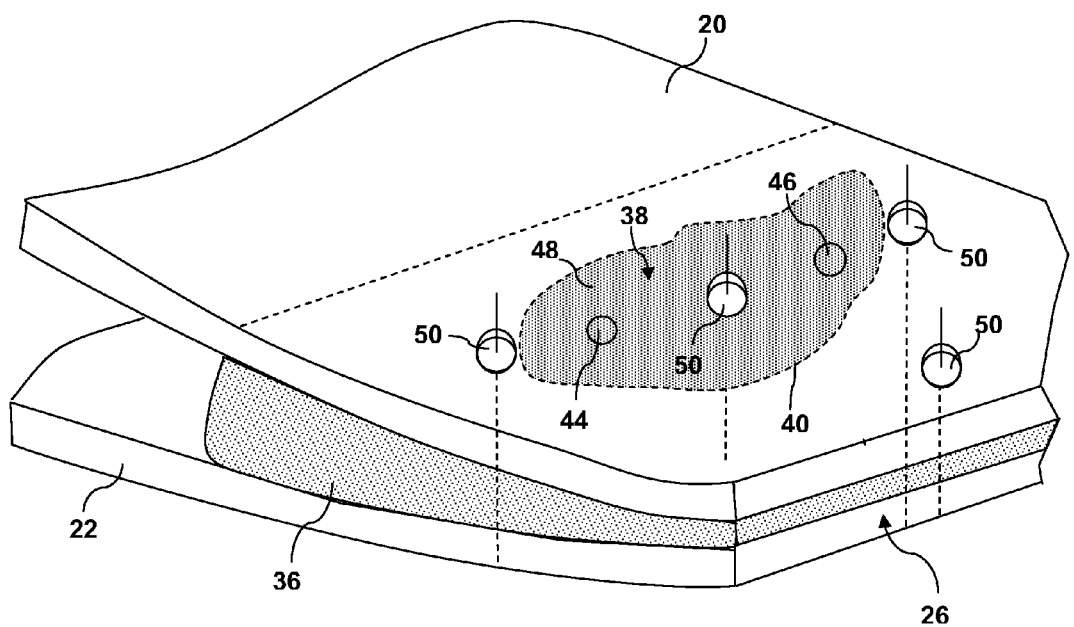
*Fig. -5-*

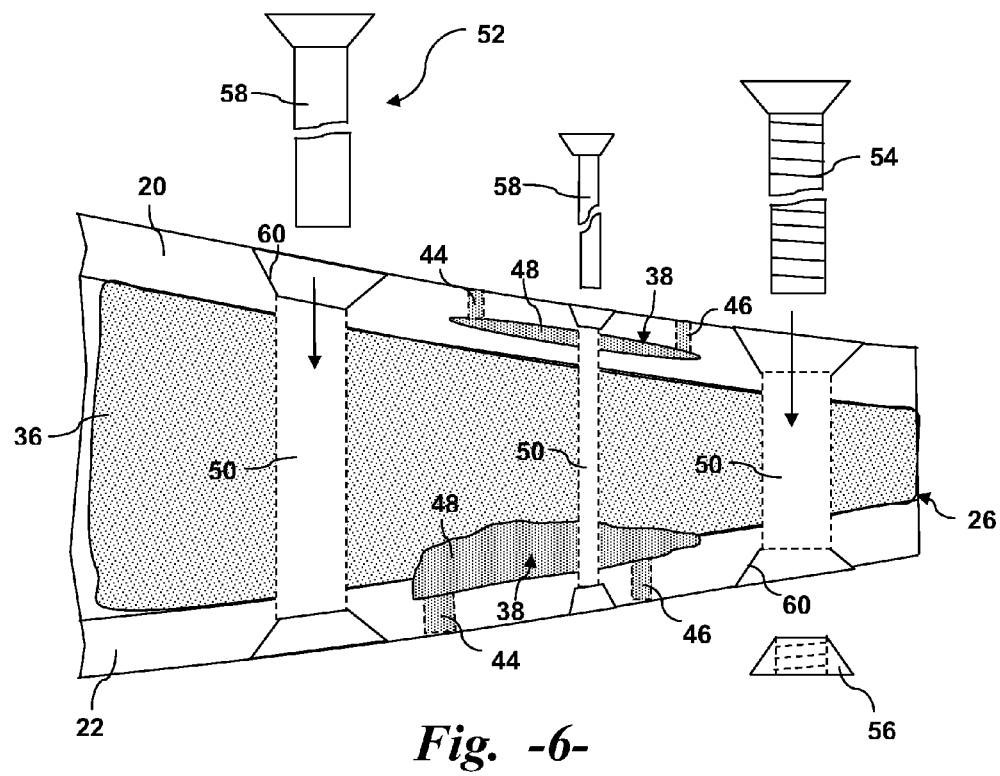
Fig. -6-
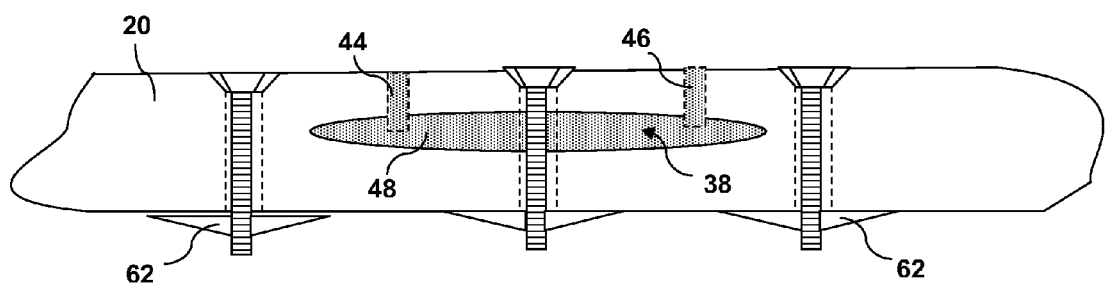
Fig. -7-

# METHOD OF REPAIRING A SUBSURFACE VOID OR DAMAGE FOR A WIND TURBINE BLADE

FIELD OF THE INVENTION

The present invention relates generally to the field of wind turbines, and more particularly to a method for repairing wind turbine blades.

BACKGROUND OF THE INVENTION

Turbine blades are the primary elements of wind turbines for converting wind energy into electrical energy. The turbine blades typically consist of a suction side shell member and a pressure side shell member that are bonded together at bond lines along the trailing and leading edges of the blade. The bond lines are generally formed by applying a suitable bonding paste or compound along the bond line at a minimum designed bond width between the shell members.

Inevitably, defects occur in the blades from the original manufacturing process or as a result of operational conditions experienced by the blade. For instance, a void in the original bonding material (i.e., from an air bubble or lack of complete fill) may eventually initiate delamination of the blade materials. Impact damage from ice, hail, lightning, birds, etc., often results in delamination. Thermal cycling (e.g., between winter and summer temperatures) may also result in blade damage. Water penetration through a crack in the external gel coat can also lead to delamination. The delamination may exist between the shell members (e.g., within the bonding material) or interlaminate (within the shell member layers).

The blade defects must be repaired, typically at the site, to ensure efficient operation of the wind turbine at over its design life and power rating. The conventional repair procedures for subsurface defects in the blade laminate call for grinding of the effected blade area and subsequent reapplication of the laminate materials. A defect is removed by grinding/sanding the laminate plies until the defect is exposed. The laminate layers are then reapplied and sanded smooth. Typically, an "over-laminate" ply is added to the repair area for additional strength. However, this additional laminate layer extends above the planar surface of the surrounding blade area and thus disrupts airflow over the blade and degrades aerodynamic performance. In addition, the grind/over-laminate repair procedure requires extensive surface preparation and skill to apply the repair laminate materials, followed by sanding, over-laminating, and painting, all of which are quite laborious and time consuming (e.g., a 2-3 day process).

A "drill and fill" technique has been used to repair blade defects in newly manufactured blades (before the blades are deployed in the field). This procedure involves drilling a hole into the defect void and subsequently filling the void with a bonding material. This procedure has not been considered useful for field repairs because of the likelihood of the defect being contaminated with dirt and oxides, resulting in inconsistent repair results. In addition, the structural strength of the repair is not optimal.

Accordingly, the industry would benefit from an improved repair procedure for wind turbine blades that is less time consuming, particularly suited for on-site repairs, and results in consistent and structurally sound repairs.

BRIEF DESCRIPTION OF THE INVENTION

Aspects and advantages of the invention will be set forth in part in the following description, or may be obvious from the description, or may be learned through practice of the invention.

In accordance with aspects of the invention, a procedure is provided for repairing subsurface defects in the laminate of a wind turbine blade shell member. The procedure includes detecting the location and boundary of the subsurface defect, for example using any manner of suitable non-destructive external inspection technique. One or more fill holes are then drilled from an external surface of the laminate into the defect and proximate to a boundary of the defect. One or more vent holes are also drilled from the external surface of the laminate into the defect and proximate to an opposite boundary from the fill hole. A flowable bonding material is then injected into the fill hole until the bonding material flows from the vent hole. The repair zone is then reinforced with at least one mechanical fastener, such as a bolt, rivet, or the like, defined through the laminate either within the boundary of the defect or outboard of the boundary of the defect.

In a particular embodiment, the repair zone is reinforced with a plurality of the mechanical fasteners. For example, the fasteners may be spaced around the periphery of the defect. Also, any number of the fasteners may be used within the boundary of the defect. Virtually any pattern and location of the fasteners are contemplated for generating a clamping load on the laminate in and around the defect during curing of the bonding material.

It is contemplated that the mechanical fasteners are not removed from the laminate and are maintained as a permanent component of the repair. In this regard, in a desirable embodiment, the mechanical fasteners are countersunk in the external surface of the laminate so as not to generate adverse airflow conditions over the surface of the blade or otherwise adversely affect the aerodynamic performance of the blade.

The unique repair procedure may be completed on-site with the wind turbine blade remaining on its respective hub and tower.

The repair procedure may be used at any location on the blade, but is particularly suited for repairing defects along the trailing edge of the wind turbine blade. In this area, the laminate is defined by the combination of the pressure side shell member, the trailing edge bond line material, and the suction side shell member, and the mechanical fasteners have a length and configuration so as to extend completely through the laminate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 is a perspective view of a conventional wind turbine;

FIG. 2 is a perspective view of a wind turbine blade;

FIG. 3 is a view of a section of a trailing edge of a wind turbine blade with laminate layers removed to reveal a subsurface defect;

FIG. 4 is a cross-sectional perspective view of the trailing edge of a wind turbine blade with a fill hole and a vent hole defined therein in accordance with aspects of the repair procedure of the invention;

FIG. 5 is a view of a trailing edge section of FIG. 4 with holes defined therein for receipt of mechanical fasteners;

FIG. 6 is a cross-sectional view of a trailing edge particularly illustrating receipt of the mechanical fasteners in and around the repair zone; and, FIG. 7 is a cross-sectional view of a repair area where access to the opposite side is not readily available.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 is a more detailed view of a wind turbine blade 16. The blade 16 includes an upper shell member 20 and a lower shell member 22. The upper shell member 20 may be configured as the suction side surface of the blade 16, while the lower shell member 20 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at a leading edge bond line 32 and a trailing edge bond line 34. In formation of these bond lines 32, 34, a bond paste 36 in flowable viscous form is applied between the mating surfaces of the shell members 20, 22 along the length of the bond lines 32, 34. The bond paste 36 is typically applied in a sufficient quantity and pattern so as to establish a designed width of the bond lines 32, 34 that ensures a minimum bonded surface area between the components. It should be appreciated that the term "bond paste" is used herein in a generic sense to encompass any type of adhesive or bonding material that is applied in an initially flowable state, such any suitable type of epoxy, compound, or other material.

FIG. 2 illustrates multiple subsurface defects 38 formed in the laminate material of either of the shell members 20, 22 along the trailing edge bond line 34. The depiction of the defects 38 in this region of the blade is presented for illustrative purposes only. It should be appreciated that the present procedure for repairing subsurface defects in a wind turbine blade may be utilized for defects 38 located at any location in the laminate materials of the blade.

FIG. 3 is an enlarged view of a section of the trailing edge 26 that encompasses one of the defects 38. Layers 42 of the upper shell member 20 have been removed in the illustration in order to depict the subsurface defect 38 having a boundary 40. The defect 38 may be a void in the bond paste 36, which may extend completely through the laminate to the opposite shell member 22. In other instances the defect 38 may be a de-lamination or void in the layers 42 that does not extend to the bond paste 36, as depicted by the defect 38 in the shell member 20 of FIG. 6. In still other instances, the defect 38 may be a void or de-lamination in the shell member that extends into the bond paste 36, as depicted by the defect 38 in the shell member 22 of FIG. 6. It should be appreciated that the present invention is not limited to repair of any particular type of defect in the blade materials.

The subsurface defects 38 may be detected any known technique. For example, the subsurface defect may be detected by inspection for surface defects, such as cracks, waviness, or any other non-destructive evaluation test method. The extent or boundary 40 of the defect 38 may be determined by, for example, tap testing, ultrasonic inspection, or any other nondestructive evaluation method.

Referring to FIG. 4, once the location and boundary 40 of the defect 38 has been determined, a fill hole 44 is drilled into the defect 38 from an external surface of the laminate, as indicated by the arrow in FIG. 4. The hole 44 is drilled proximate to the boundary 40 of the defect, as compared to a more central location. Still referring to FIG. 4, a vent hole 46 is also defined from the external surface of the shell member 20 into the defect 38 proximate to the opposite boundary relative to the fill hole 44. This pattern of the drill hole 44 and vent hole 46 helps to ensure that a flowable bonding material 48 that is injected into the defect 38 through the fill hole 44 completely (or nearly completely) fills the entire void of the defect 38. As the bonding material 44 flows into the defect 38, air is forced out through the vent hole 46. By disposing the vent hole 46 generally opposite from the fill hole 44 proximate to the opposite boundary 40, a more complete fill of the void with the bonding material 48 is achieved.

It should be readily appreciated that any number and pattern of fill holes 44 and vent holes 46 may be defined through the external surface of the shell member 20 so as to achieve a complete fill of the defect void, depending on the overall shape, location, and other characteristics of the defect 38. The invention is not limited to any particular number or pattern of fill holes and vent holes.

The flowable bonding material 48 is injected through the fill hole 44 until the material flows from the vent hole 46, which is an indication of a complete fill of the defect 38. The holes 44 and 46 may be filled with the bonding material 48 so that, when cured, the material 48 forms a flush surface with the surrounding laminate material with little or no finishing.

Referring to FIG. 5, the repair zone is reinforced with any number and configuration of mechanical fasteners 52 that generate a clamping load force on the laminate material in and around the repair zone as the bonding material 48 cures. A plurality of fastener holes 50 are defined through the laminate for receipt of the mechanical fasteners 52 (FIG. 6). These holes 50 may be spaced around the periphery of the defect boundary 40, as well as within the boundary 40. The number and pattern of the holes 50 and mechanical fasteners 52 will vary depending on the size, location, and other characteristics of the defect 38. In the embodiment depicted in FIGS. 5 and 6, three holes 50 are spaced around the boundary 40 and an additional hole 50 is defined through the defect 38 for the purpose of generating the clamping load on the repair zone around and within the defect 38. Referring to FIG. 6, in a desirable embodiment, the holes 50 include countersunk heads 60 defined in the shell members 20 and 22 for receipt of correspondingly shaped heads on the mechanical fasteners 52.

The fasteners 52 may be any manner of conventional mechanical fasteners, such as a rivet 58, or bolt 54 with associated nut 56. The fasteners 52 reside within the countersunk heads 60 and are preferably flush with the surrounding surface of the shell members 20, 22 so as not to adversely affect the aerodynamic performance of the blade.

The mechanical fasteners 52 are installed and generate the clamping load on the laminate during the curing of the bonding material 48, as discussed above. Although there may be certain instances wherein the mechanical fasteners 52 are subsequently removed from the blade and the holes 50 filled with a bonding material and finished, desirably, the mechanical fasteners 52 are not removed from the laminate and are retained as a permanent component of the repair. The fasteners 52 provide an added degree of permanent strength and integrity to the repair zone.

In the embodiment depicted in the figures, the defects 38 are adjacent to the trailing edge 36 and, thus, the mechanical fasteners 52 have a length and configuration so as to extend completely through the opposite shell members 20, 22. In other embodiments wherein the subsurface defects 38 are within the shell member materials at other chord locations, for example at a mid-chord location, other types of mechanical fasteners may be utilized, such as a through-wall anchor bolt, toggle bolt, or similar device, wherein it is not necessary to have access to the opposite end of the fastener in order to engage and tighten the fastener 52. This configuration is illustrated, for example, in FIG. 7 wherein the mechanical fasteners are toggle bolts 62 used to provide a clamping force within and around the boundary 40 of the subsurface defect 38.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A procedure for repairing subsurface defects in a shell member laminate of a wind turbine blade, comprising:
    detecting the location and boundary of the subsurface defect in the laminate;
    drilling a fill hole from an external surface of the laminate into the defect proximate to a boundary of the defect;
    drilling a vent hole from the external surface of the laminate into the defect proximate to an opposite boundary from the fill hole;
    injecting a flowable bonding material into the fill hole until the bonding material flows from the vent hole; and,
    reinforcing the repair zone with at least one mechanical fastener defined through the laminate either within the boundary of the defect or outboard of the boundary of the defect.

2. The repair procedure as in claim 1, wherein the repair zone is reinforced with a plurality of the mechanical fasteners.

3. The repair procedure as in claim 2, wherein the repair zone is reinforced with a plurality of the mechanical fasteners outboard of the boundary of the defect and at least one mechanical fastener within the boundary of the defect.

4. The repair procedure as in claim 1, wherein the mechanical fastener is countersunk in the external surface of the laminate.

5. The repair procedure as in claim 1, wherein the mechanical fastener is used to generate a clamping load on the laminate in the repair zone during curing of the bonding material.

6. The repair procedure as in claim 1, wherein the mechanical fastener is not removed from the laminate and is maintained as a permanent component of the repair.

7. The repair procedure as in claim 1, wherein the location and boundary of the defect are detected with non-destructive external inspection techniques.

8. The repair procedure as in claim 1, further comprising drilling a plurality of the fill holes and vent holes to ensure a complete fill of the subsurface defect.

9. The repair procedure as in claim 1, wherein the procedure is completed on-site with the wind turbine blade remaining on its respective hub and tower.

10. The repair procedure as in claim 1, wherein the procedure is conducted for defects along the trialing edge of the wind turbine blade and the mechanical fastener extends through the pressure side shell member, the trailing edge bond line material, and the suction side shell member.

\* \* \* \* \*